(12) United States Patent
Hudson et al.

(10) Patent No.: US 6,501,964 B1
(45) Date of Patent: Dec. 31, 2002

(54) SUB-MACRO CELLULAR BASE STATION

(75) Inventors: John E. Hudson, Stansted (GB); Keith Russell Edwards, Brentwood (GB); Paul Barton, Torquay (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/467,282

(22) Filed: Dec. 20, 1999

(51) Int. Cl.[7] .................................................. H04B 1/38
(52) U.S. Cl. ..................................... 455/562; 455/277.2
(58) Field of Search ........................... 455/16, 439, 436, 455/429, 501, 562, 277.1, 277.2, 272; 370/335, 16, 439, 429, 436, 501, 562

(56) References Cited

U.S. PATENT DOCUMENTS

| | | | |
|---|---|---|---|
| 5,812,933 A | * | 9/1998 | Nikki |
| 5,812,956 A | * | 9/1998 | Pregont |
| 5,974,320 A | * | 10/1999 | Ward et al. |
| 6,078,823 A | * | 6/2000 | Chavez et al. |
| 6,101,176 A | * | 8/2000 | Honkasalo et al. |
| 6,112,086 A | * | 8/2000 | Wala ........................... 370/328 |
| 6,167,283 A | * | 12/2000 | Korpela et al. |
| 6,223,055 B1 | * | 4/2001 | Cyr |
| 6,298,219 B1 | * | 10/2001 | Patronen et al. |

* cited by examiner

Primary Examiner—Nguyen T. Vo
Assistant Examiner—Nghi H. Ly
(74) Attorney, Agent, or Firm—Lee, Mann, Smith, McWilliams, Sweeney & Ohlson

(57) ABSTRACT

The invention relates to sub macro cellular layers of a wireless communications system. An object of wireless communications system design is to reduce the number of base station sites required by increasing their range and or capacity. The term, "capacity" is used herein to refer to any suitable measure which provides an indication of how many conventional mobile terminals or other terminals are able to communicate effectively with a given antenna arrangement. Macro base station sites for cellular systems are particularly expensive, both in terms of the equipment required and the need for a geographical site for each cell site where, inter alia, large structures are frequently employed where planning permission is required. The present invention seeks to provide a system and method for reducing the effects of adjacent channel interference, especially in 3G CDMA base stations.

12 Claims, 6 Drawing Sheets

Physical deployment of two receiving antennas in an indoor situation

Deployment of three receiving antennas in an indoor situation

SUB-MACRO CELLULAR BASE STATION

FIELD OF THE INVENTION

The invention relates to sub-macro cellular layers of a wireless communications system. In particular, the invention relates to a sub-macro cellular base station network for third generation cellular and TDD mode cellular wireless communications, for the communication of voice and data. The invention also relates to sub-macro cellular communications networks and Wireless Local Area Networks (WLANs) capable of supporting discontinuous and/or bursty data transmission.

BACKGROUND OF THE INVENTION

The term "wireless communications network" is used to refer to a communications network which is divided into geographical cells or areas. For example, cellular communications networks are usually divided into cells which are geographical areas each of which contains a base station transceiver (BST). Mobile and fixed subscriber stations located in the communications network communicate with one or more base station transceivers, for example, the closest base station transceiver. Each base station transceiver has a limited range and a cell can be thought of as a geographical region over which a base station transceiver is intended to operate effectively. Cellular communication network cells can be split up further in regions of poor coverage and/or high demand: sub-cells in the region of 100–400 metres radius are known as micro-cells; sub-cells in the region of 50–100 metres are known as pico-cells. For convenience the largest cell unit shall be referred to as a macro-cell smaller cells either pico or micro are hereinafter referred to as 'sub-macro' cells. FIG. 1 shows the inter-relationship of the various cells in a cellular communications system 10. Macro-cells are identified as 12, within which micro-cells 14 lie: within the micro-cells lie pico-cells 16. These can provide overlapping coverage between themselves and the overlying cell. Similarly in a WLAN, mobile and fixed subscriber stations (which will be referred to hereinafter as terminals) communicate with base stations, the number of WLAN base stations per terminal typically being greater than is the case for cellular communication networks, to cater for the smaller size of areas of coverage and to take into account the greater effect of the internal walls of buildings and the like which block or reduce signal propagation and, indeed, are present as signal reflectors.

Mobile terminals such as mobile telephones may be located within a cellular communications network and send radio signals to and receive radio signals from base station transceivers. Each mobile station operating within a cell requires a certain amount of bandwidth to operate and because the total bandwidth of base station transceivers is limited the number of mobile terminals which can operate within a cell is limited.

In general an object of wireless communications system design is to reduce the number of base station sites required by increasing their range and or capacity. The term, "capacity" is used herein to refer to any suitable measure which provides an indication of how many conventional mobile terminals or other terminals are able to communicate effectively with a given antenna arrangement. Macro base station sites for cellular systems are particularly expensive, both in terms of the equipment required and the need for a geographical site for each cell site where, inter alia, large structures are frequently employed where planning permission is required. In the case of micro-cell and pico-cell applications which are frequently indoors, the installation costs can be moderate. In the case of data communications, the requirement for an instantaneous high bandwidth of, typically, short duration can cause problems. That is to say, systems are increasingly required to operate under bursty traffic conditions where the number of active users is only a fraction of the potential ones.

Various TDD modes have been proposed for the $3^{rd}$ generation cellular mobile radio component of the ITUR International Telecommunications Union (Radio) IMT 2000 concept. Due to implementation technology constraints, it has proven difficult to prevent or reduce spurious emission from a mobile transmitter power amplifier, the levels of which can rise as high as −28 dB in the adjacent frequency channel relative to the level in the nominal band. i(his would tend to happen under conditions of worst case manufacturing tolerance and low battery voltage. There are also constraints on the frequency filtering of receivers which mean that the in-band transmission of an ideal mobile can cause interference in adjacent channels.

Statistically these problems are normally unlikely in a random distribution of users in an area served by two (or more) operators, but become significant when a second operator's mobile happens to come physically close to a first operators base station receiver. Reception of spurious emissions due to a second operator's mobile at a base station will appear as additional noise and will reduce the base station's sensitivity resulting either in a reduction of capacity, an increase in the transmission power requirement of its mobiles, and a consequential increase of interference to other nearby cells. The problem, when it does happen, is significant because a large number of users have their communication degraded by a single interfering mobile.

It is believed that the indoor applications of 3G base stations and cells are at particular risk since the physical density of mobile users in, for example, rail stations, shopping malls, is high. Nevertheless, outdoor applications are not immune to such problems.

The areas where it is applicable is in the reduction of interference to the receiver of a base station belonging to a first operator arising from uncontrollable mobile stations subscribing to a second operator which can operate at high level powers, be physically close to, and use an adjacent frequency channel for their transmission. These effects are most likely to arise in time division duplex modes (TDD) of the cellular system but can also arise as a mixed frequency division duplex FDD/TDD situation. Also interference from a second operator's base station can arise at the first operator's base station but this issue is limited to TDD mode.

OBJECT OF THE INVENTION

The invention also seeks to provide a system and method for reducing the effects of adjacent channel interference (ACI) in third generation code-division multiple access (CDMA) base station.

The invention also seeks to provide a system and method for reducing the effects of co-channel interference especially in unsynchronized networks and of adjacent channel interference from other operator's base stations and terminals in TDD mode and from terminals in FDD mode.

SUMMARY OF THE INVENTION

In accordance with a first aspect of the invention there is provided a sub-macro base station arrangement for a wireless communication system, the base station comprising a distributed antenna arrangement comprising at least two antennas, wherein the spacing between at least one pair of antennas is at least twice the minimum allowable range for a source of interference to one antenna.

This minimises the risk that more than one antenna is close to a source of interference. This has the advantage that the effective interference from sources of interference can be reduced. The source of interference could be a mobile terminal or a base station. For a frequency of 1900 MHz, a distance of around 15 m will provide sufficient separation for seducing the effects of adjacent channel interference.

The system is suitable for micro-cells, pico-cells and local area networks.

In accordance with a further aspect of the invention at least one of the antennas of the distributed antennas comprises two or more antenna elements having variable phase feeds whereby said antenna is operable to form nulls in its radiation pattern.

In accordance with a further aspect of the invention there is provided a method of communicating in a sub-macro wireless communication cell, wherein the sub-macro base station comprises a distributed antenna arrangement comprising at least two antennas, wherein there is a spacing between at least one pair of antennas is at least twice the minimum allowable range for a source of interference for one antenna, the method comprising, the step of providing simultaneous links between the distributed antennas to a terminal whereby to ameliorate the effect of a source of interference.

BRIEF DESCRIPTION OF THE DRAWINGS

In order that the present invention can be more fully understood and to show how the same may be carried into effect, reference shall now be made, by way of example only, to the figures as shown in the accompanying drawing sheets wherein.

DETAILED DESCRIPTION OF THE PREFERRED EMBODIMENTS

Figure 1:
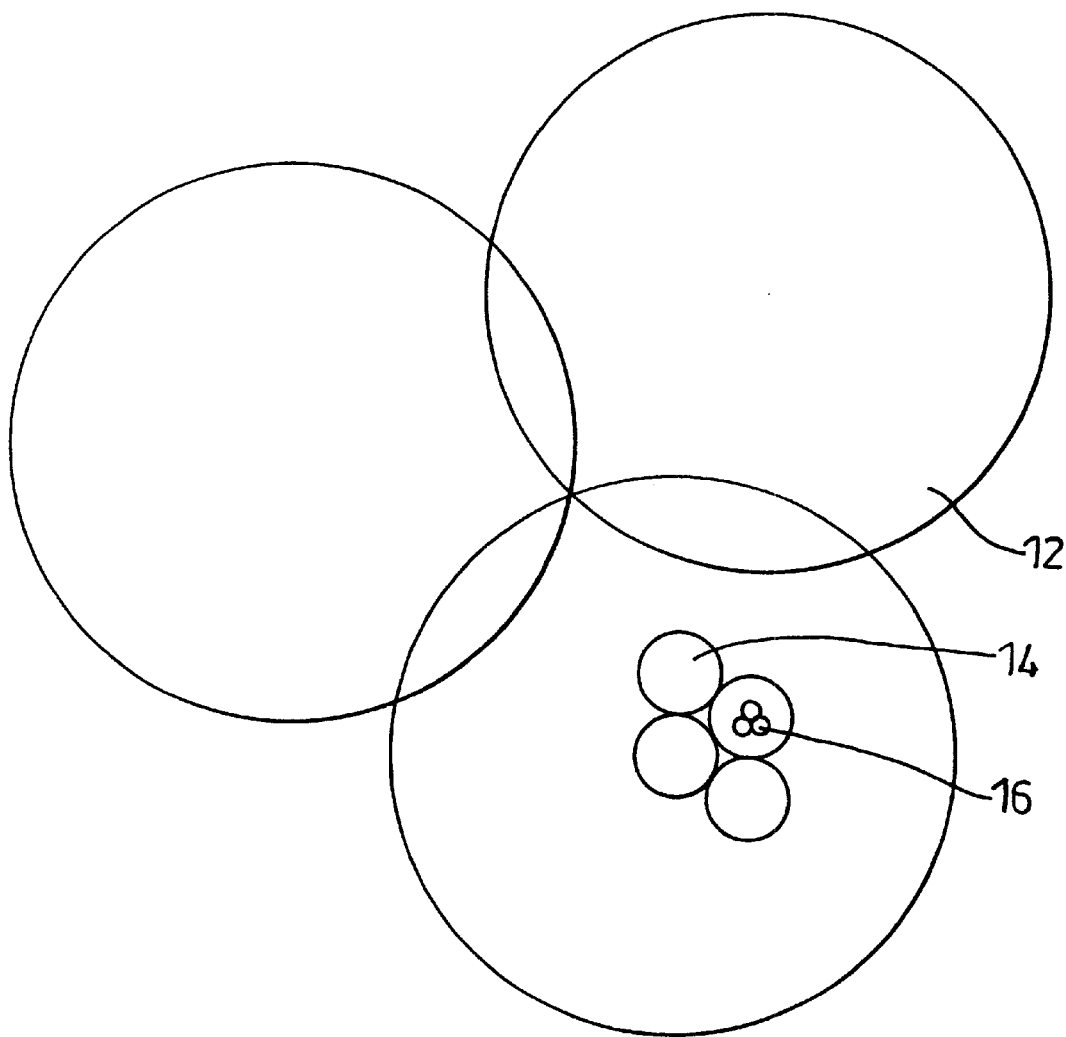
FIG. 1 shows the interrelation between macro, micro and pico-cells in a cellular communications system.

There will now be described by way of example the best mode contemplated by the inventors for carrying out the invention. In the following description, numerous specific details are set out in order to provide a complete understanding of the present invention. It will be apparent, however, to those skilled in the art that the present invention may be put into practice with variations of the specific.

The minimum mobile to base station distance allowable before base densensitization occurs is limited by:
(i) spurious emissions from the handset in the adjacent radio channel due to power amplifier imperfections;
(ii) less than ideal selectivity at the base station receiver which allows the adjacent channel to pass through;
(iii) intermodulation effects in the base station;
(iv) blocking of the base station receiver front end amplifiers.

Of these possibilities, the first is the most important and cannot be controlled by the base station operator in any way since the interfering handset will probably belong to a different operator—A specimen calculation follows. The 3G standards allow a spurious emission level of −33 dB in either adjacent channel relative to its nominal one. For a typical hand held terminal with a regulatory power limit of +21 dBm but operating at +11 dBm this corresponds to a radiated power of −32 dBm.

The base receiver will be desensitised when the received power in its dipole antenna equates to the thermal noise level of kTB (Boltzman's constant×absolute temp×bandwidth) plus the noise figure of say 5 dB plus a consideration for general background noise (intra-cell multiple access interference from own users) of a further 10 dB or so. A value of 10 dB for multiple access noise plus interference is taken into account. For a base receiver with a bandwidth of 3.84 MHz at a temperature of 300° K., the noise levels are thus:

$$10\log(1.38 \times 10^{-23} \times 300 \times 3.84 \times 10^6) + 30 + 5 + 10 = -93 \text{ dBm.}$$

The value of 10 dBm is due to a noise floor lift due to other users in a high multiple access interference situation, the 5 dBm value being the noise figure as described above, the +30 dBm arising from the conversion from dBw to dBm.)

The minimum associated losses in the radio path are then $$93 - 32 = 61 \text{ dB}$$

The free-space radio propagation loss, dipole to dipole, at a wavelength of λ=0.158 m (1.9 GHz) and with free space propagation is $$L = 10 \log\left(\frac{\lambda^2}{(4\pi)^2 R^2}\right) = -38.01 - 20 \log(R)$$

which, equating L to the losses above gives the following minimum ranges

R=15.8 m

Clearly this range estimate can be further varied to a certain extent if the propagation law is not inverse square law. An interfering mobile operating at these ranges would increase the background noise level by 3 dB and begin a desensitization process at the base station which, for practical purposes, would result in a demand for an increase in the power level of its mobile terminals and hence reduced maximum range.

(Path loss permitted=UE Transmitter Power−(BS Thermal Noise+ C/(N+I)) =11 dBm−(−93)+4=108 dB Path loss indoors =37+30 logR Maximum Range 232.6 metres (at 2 GHz)

At 100 metres, the maximum pico-cell range, the path loss is equal to 97 dB, allowing for a 11 dB shadow margin before the level of 11 dBm from a mobile is reached on average (even with 10 dB desensitisation due to other system noise uplift).

Note that the application of rigid system design rules when computing the minimum distances is difficult to provide a hard range value. If the minimum distance rules were ignored, the second operator interference effects on the base station would be rather unpredictable, though generally very negative. A first possible response would be that a base station controller would command all its mobiles to increase their output power to maintain the previous carrier to interference ratio, but this would cause the more distant mobiles to run out of power and their signals would be lost. The basestation would drop these calls within a second or so.

High speed data connections would be especially vulnerable because of their inherently high required mobile RF power levels. Any raised power levels from mobiles would cause increased interference to a second operator and such a second operator could become the victim of his own interference. New mobile calls from long-range mobiles would not be admitted because of their low signal to interference ratios. Effectively the operating range of the base would be reduced. if the interference level is +10 dB above previous noise level, the range would decrease by 1/sqrt(10) and the coverage area by 10-fold if the propagation law was inverse square law (which is most favourable assumption). Nevertheless, it may be that there are situations where the interference causes none of these effects if the terminals associated with a base station are all local and can operate at a sufficiently high signal level.

Figure 2:
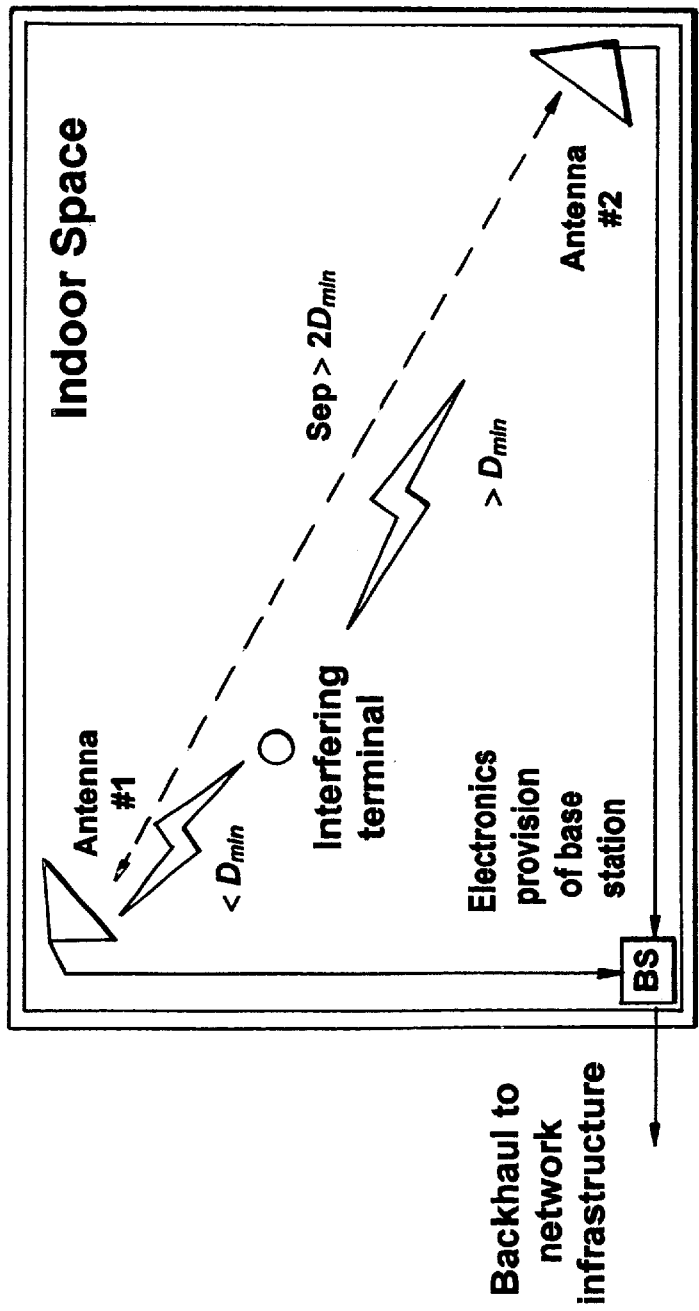
FIG. 2 shows an indoor space with two base station antennas deployed some distance apart in accordance with a first embodiment of the invention.

Referring now to FIG. 2, there is shown an indoor space in which a base station is situated comprising two diversity antennas each having electrical characteristics for reception similar to those already in use (or proposed for use) in 3 G base stations. The physical deployment of the antennas is optimised, so as to minimise the risk that more than one antenna is close to an interfering mobile, or two antennas are close to two interfering mobiles etc (an interfering mobile would be considered as one operating at similar frequency but in accordance with another operator's protocol). The signal processing used at the base station is essentially an unmodified version of algorithms already designed such as switching, maximum ratio or optimal ratio combination. In a switching case where a mobile changes from one base station to another, the antenna(s) which has the highest cross-correlation with a known training sequence is selected rather than employing simple maximum power criterion for the determination of the preferred antenna.

The arrangement of the antennas is as follows: if the minimum allowable range of an interfering mobile is $D_{min}$ without degradation of the base performance, then the spacing of the antennas can be at least $2D_{min}$ if they are operating in essentially free space. Upon deployment the two antennas, in an indoor closed environment, would benefit from a physical spacing such that it is not possible to for a single interfering mobile to severely degrade the receiver performance of both antennas at the same time.

Network design normally allows an "interference margin" to permit acceptable operation with a certain level of interference. Adjacent channel interference received at a base station comprises a general background level plus the effects of a few close-by users. Worst case conditions are normally met by a few or single close users. For a non-diverse system the minimum distance or 'acceptable minimum range' from mobile to base station antenna is met by the range at which a mobile user would cause the inherent interference margin, to be exceeded.

Figure 3:
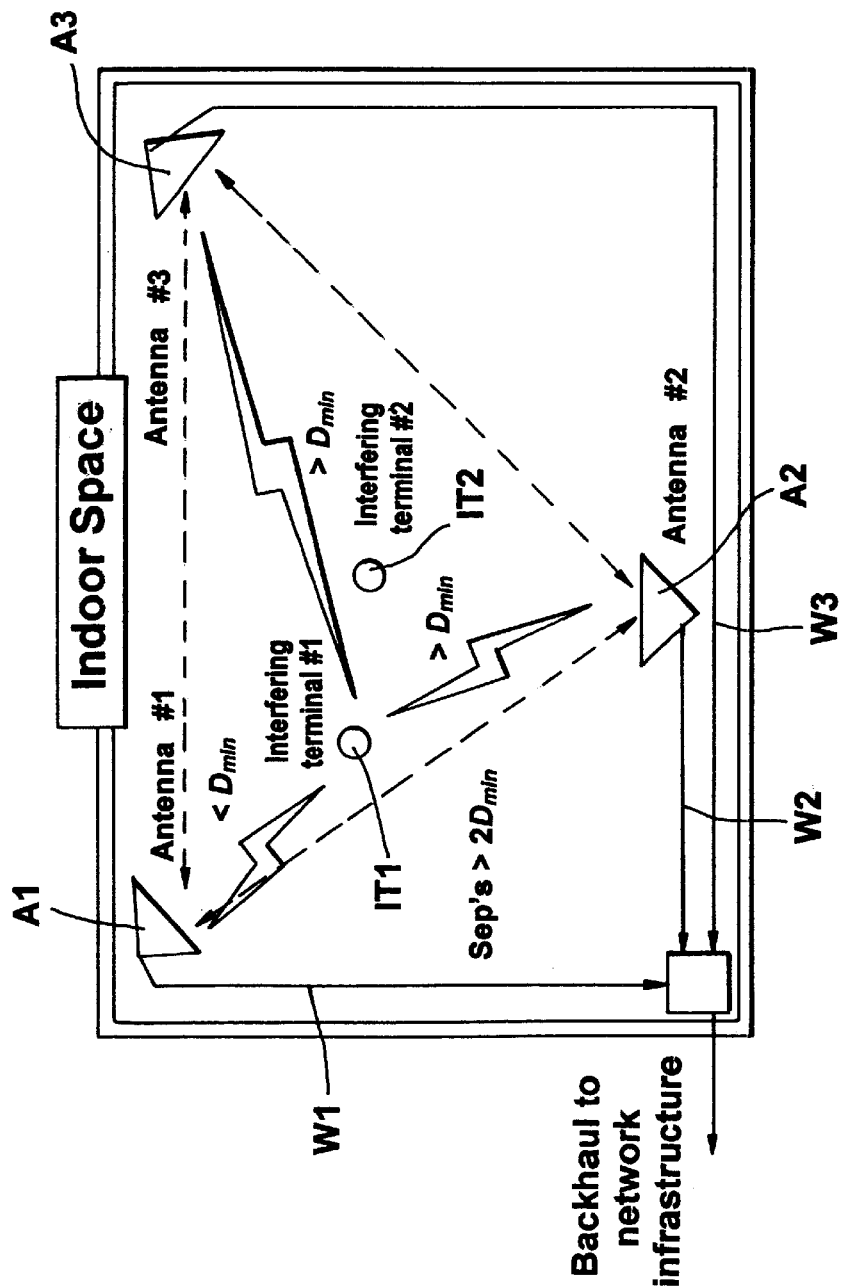
FIG. 3 shows an indoor space with three antennas in accordance with a second embodiment of the invention.

In the case that there are a number, N, of receiving antenna (where N>2) then N antennas can be arranged in an optimal distribution in the indoor environment then it possible to ensure that N−1 interfering mobiles can operate anywhere and the reception of the desired transmission is still possible on one of the N receiving antennas. Referring to FIG. 3, there is shown an indoor environment in which three antennas A1, A2, A3 are situated. The antennas are connected to a base station by wiring W1, W2, W3. Two interfering terminals IT1, IT2 are shown. IT1 is at a distance of less than the minimum interference distance to antenna A1. This interfering terminal IT1 may disrupt the channels from antenna A1 or may completely saturate the antenna. Nevertheless there are two other antennas to which mobile terminals will be able to transmit signals.

Figure 4:
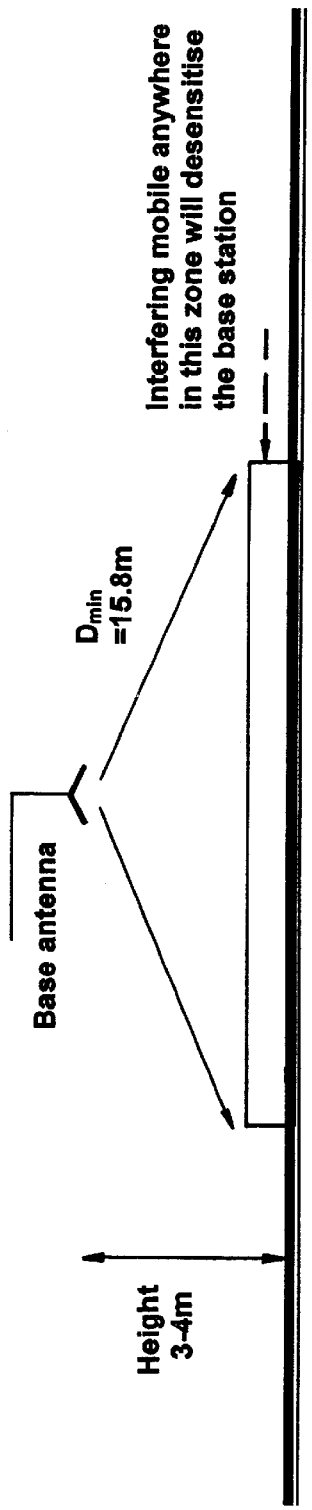
FIG. 4 shows a prior art system with one antenna.
Figure 5:
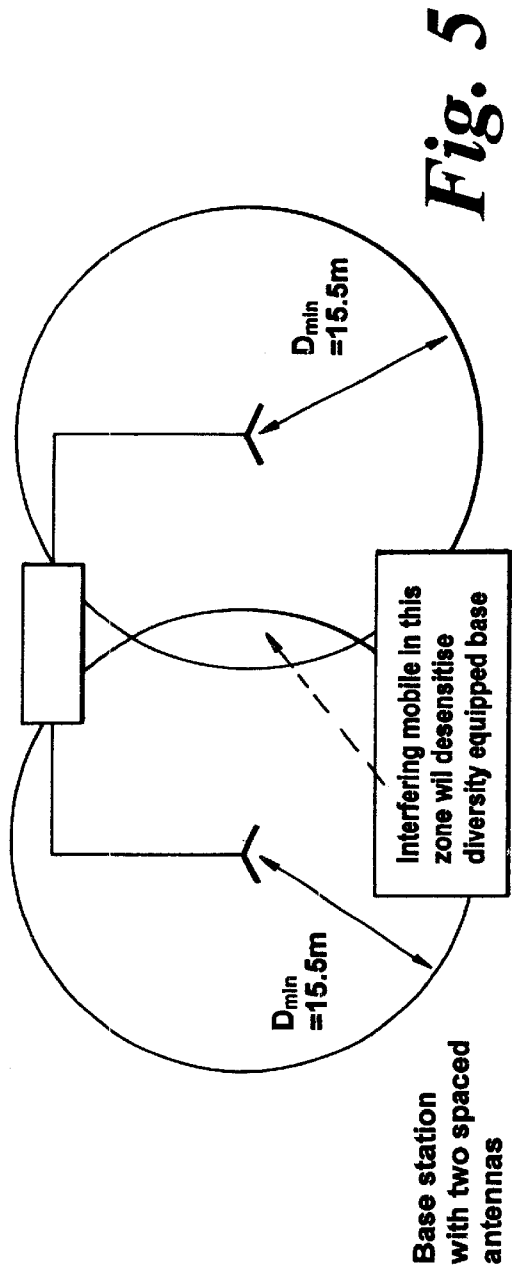
FIG. 5 shows a base station having two antennas.

FIG. 4 shows a prior art instance of a base station with a single antenna. An interfering terminal could disrupt the channels from the antenna or may completely saturate the antenna. FIG. 5 shows the situation in the case where the separation of two antennas is not quite Dmin. There is a small zone in the region of Dmin overlap where interfering mobiles could desensitise adversity equipped base station. Note that the figure shows the system in two dimensions. It may be the case, for antennas mounted sufficiently above a nominal head-shoulder level height (1.3–2 m height above ground) that mobile terminals are generally employed, that at such level the Dmin is actually achieved.

Figure 6:
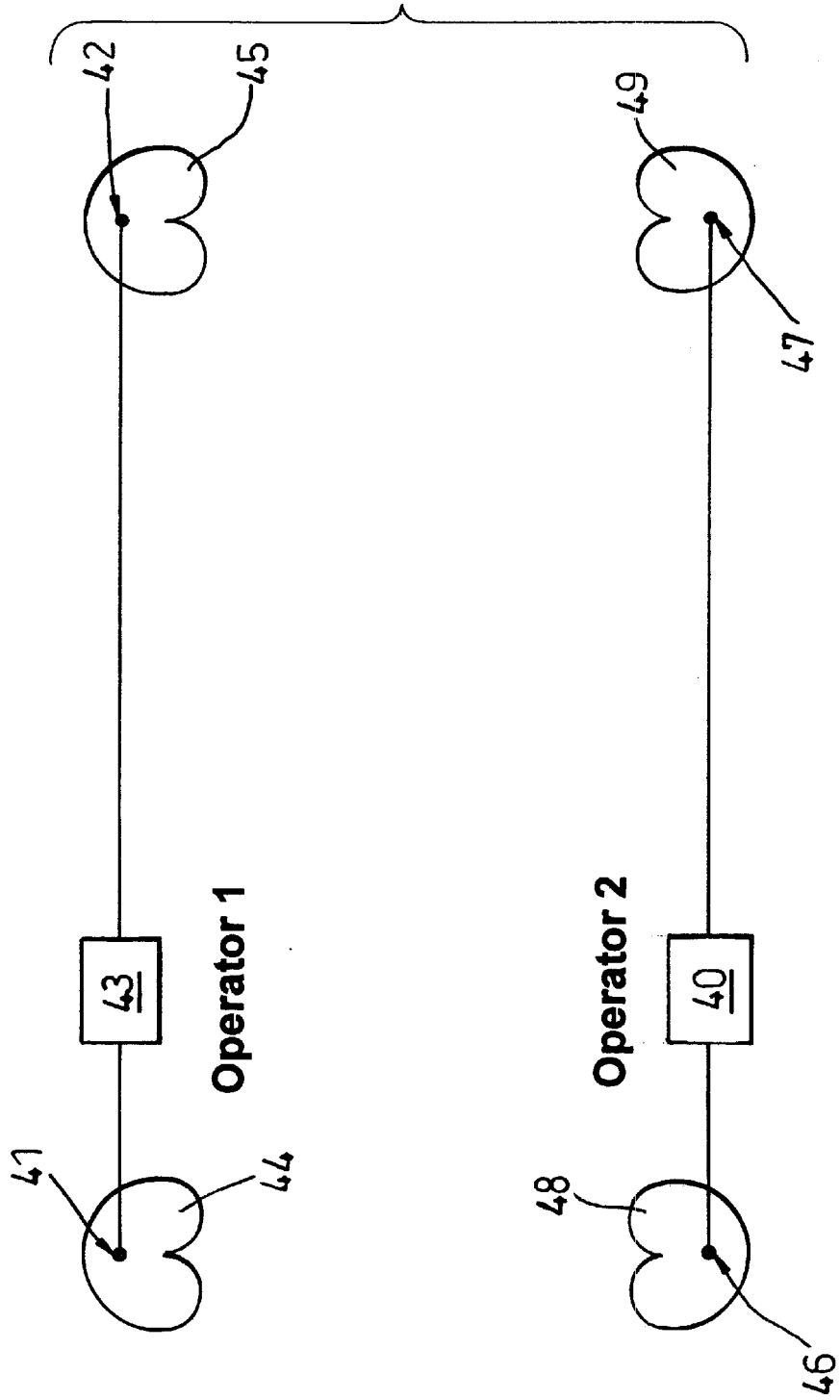
FIG. 6 shows a further embodiment of the invention.

In FIG. 6 there is depicted a pico-cell arrangement of two base stations having two distributed antennas. Each distributed antenna comprises two or more antenna elements in an array which employ different phase feeds whereby to form a steerable null, as is known. Whilst it would be preferred that the antennas of different operators are not opposite each other, the configuration of an indoor shopping mall or other type of area may dictate such an arrangement. Antennas 41 and 42 associated with pico-cell base station 43 of operator 1 have nulls in their respective distribution pattern 43, 44 directed towards opposite corresponding antennas 46, 47 and respective radiation patterns 48, 49 associated with pico-cell base station 40 of operator 2.

Figure 7:
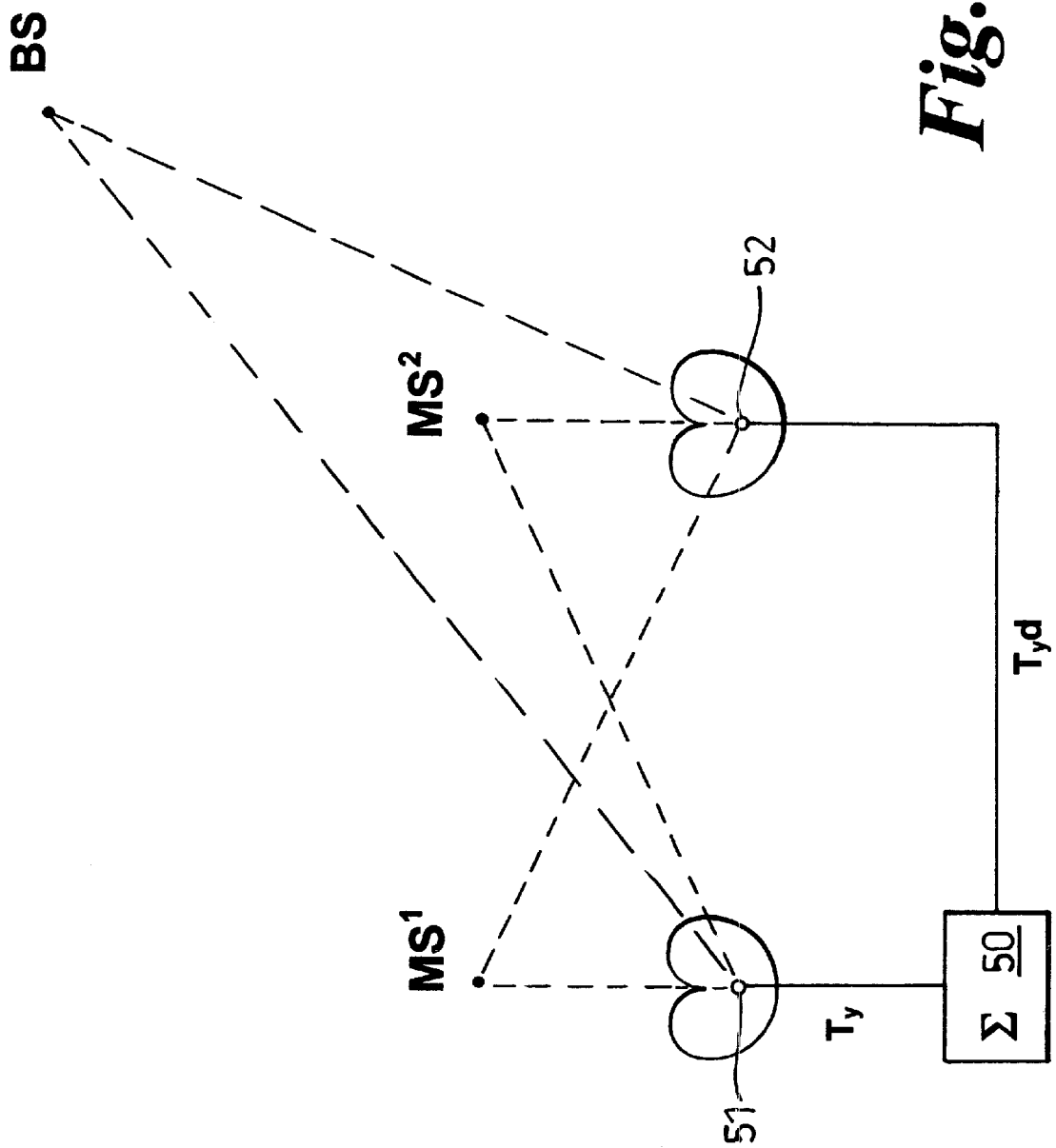
FIG. 7 shows a still further embodiment of the invention.

Turning now to FIG. 7 there is shown a further embodiment of the invention wherein there are two distributed antennas. Each distributed antenna comprises two or more antenna elements in an array which employ different phase feeds whereby to form a steerable null. A permanent null may be required on reception because of a nearby continuous source of interference, for example, another operator's base station as will be appreciated, the null would be useful to minimise interference with respect to another operator's base station equipment and terminals. Alternatively a null can be formed with respect to a temporary source of interference, for example, a mobile operating in an adjacent channel. Pico/micro base station 50 has two distributed antennas 51, 52. Base station BS provides interfering signals to which nulls are steered in the radiation patterns 53, 54. It can be seen that whilst the far distance signals due to BS can be reduced, signals from MS2, which is similarly angled to the base station 50, is not nulled out.

The system is envisaged for use in sub-macro layer deployment ie pico-cell and micro-cell indoor environments such as office blocks, shopping malls and indoor sports arenas. The cells would have a radius of up to around 500 m and the antennas themselves would be spaced 10 to 20 m or further apart. In indoor environments walls and partitions can significantly reduce the operating range, as can metallic cupboards, partitions and the like. In the use of such a distributed antenna system, the likelihood of weak spots in the radiation pattern is very much reduced compared to known systems such as the CT2 or DECT system.

The present invention addresses issues of interference on similar frequencies by mobiles transmitting and receiving with respect to competitor operators. Accordingly the solution provided by the present invention enables communication to be maintained with mobiles of a particular system irrespective of the cause of interference from other mobiles or broadband sources.

What is claimed is:

1. A sub-macro base station arrangement for a wireless communication system, the base station comprising a distributed antenna arrangement comprising at least two antennas, wherein the spacing between at least one pair of antennas is at least twice the minimum allowable range for a source of interference to one antenna and the base station is arranged to determine which of the antennas is subject to more interference, and use this to select which antenna to use, or to alter how the antennas are combined.

2. A base station arrangement according to claim 1 wherein the source of interference is a terminal.

3. A base station arrangement according to claim 1 wherein the source of interference is another base station.

4. A base station arrangement according to claim 1 wherein the minimum distance between the antennas takes into account an allowance for an increase in background noise level due to an interfering noise source(s).

5. A base station arrangement according to claim 1 wherein at least one of the antennas of the distributed antenna arrangement comprises at least two antenna radiating elements which are operable to form nulls in a resultant radiation pattern.

6. A base station arrangement according to claim 1 wherein the base station is a pico-cell base station or micro-cell base station.

7. A base station arrangement according to claim 1 wherein the base station is operable with a local area network.

8. A base station arrangement according to claim 1 wherein the signals are transmitted in a time division duplex mode and/or a frequency division duplex mode.

9. A method of communicating in a sub-macro wireless communication cell, wherein the sub-macro base station comprises a distributed antenna arrangement comprising at least two antennas, wherein there is a spacing between at least one pair of antennas is at least twice the minimum allowable range for a source of interference for one antenna, the method comprising, the steps of providing simultaneous links between the distributed antennas to a terminal, determining which of the antennas is subject to more interference and using this to select which antenna to use, or to alter how the antennas are combined whereby to ameliorate an effect of the source of interference.

10. A method according to claim 9 wherein at least one of the antennas of the distributed antenna arrangement comprises at least two radiating elements which are operable to form nulls in a resultant radiation pattern.

11. A method according to claim 9 wherein the base station is operable within a pico-cell or a macro-cell.

12. A method according to claim 9 wherein signals are transmitted in a time division duplex mode and/or a frequency division duplex mode.

* * * * *